United States Patent Office 3,227,753
Patented Jan. 4, 1966

3,227,753
MANUFACTURE OF BIUREA
Louis Mehr, Flushing, N.Y., and Edward G. Deegan, Jersey City, and Vincent G. Sarii, Pompton Plains, N.J., assignors to Wallace & Tiernan Inc., Belleville, N.J., a corporation of Delaware
No Drawing. Filed Feb. 19, 1962, Ser. No. 174,253
6 Claims. (Cl. 260—554)

This invention relates to the manufacture of hydrazodicarbonamide, commonly known as biurea. In a more particular sense, the invention relates to a novel and economical process for the synthesis of biurea from hydrazine and urea.

Biurea, represented by the formula

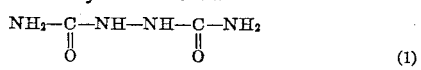

(1)

is a substance of known use as a chemical of commerce, and is of particular importance as an intermediate, since when oxidized to azodicarbonamide, the latter compound is valuable for various uses, e.g. as a chemical blowing agent, and also as an agent in flour maturing procedure in accordance with United States Patent No. 2,903,361. Hitherto biurea has been produced from the reaction of urea and hydrazine in concentrated solution, with the hydrazine in the hydrate form; an alternative method of preparation has employed urea with a salt of hydrazine, such as sulfuric acid salt, in concentrated solution. Both these processes, however, are undesirably expensive, due to the high intial cost of preparing concentrated solutions of hydrazine or hydrazine salts. Heretofore no method has been known whereby biurea could be produced from urea and a dilute aqueous solution of hydrazine, such as may be obtained by available procedures at comparatively low expense.

The present process is specifically concerned with the manufacture of biurea from urea and such dilute hydrazine solution according to the reaction

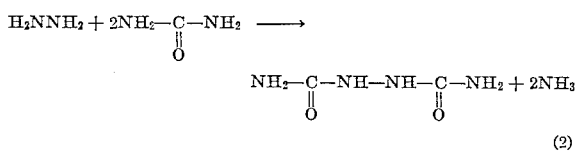

(2)

It has been found that dilute solutions of hydrazine, such as obtained by the available procedures referred to above, unavoidably contain amounts of carbonate ion. The present process is based on the discovery that this carbonate ion inhibits the production of biurea from such dilute solutions of hydrazine and urea (because, as is now believed, it interferes with the urea in the mixture, preventing its reaction with hydrazine), and on the further discovery that a good yield of biurea can be obtained from a mixture of urea and a dilute aqueous solution of hydrazine, with concomitant economic advantages, by first removing the carbonate ion and then heating the mixture under reflux for a prolonged period. Specifically, the foregoing method may be used with dilute aqueous solutions of hydrazine containing hydrazine, after carbonate removal, in a concentration of about 1% to about 10% (and advantageously with solutions having a concentration, after carbonate removal, of about 1% to about 5%, the present invention being particularly related in its most specific aspects to the use of such very dilute hydrazine solutions, as to which the problem of producing biurea is particularly acute). Amounts of biurea actually obtained with this method range up to 99% of the amount theoretically obtainable from hydrazine in the quantity used; with an initial hydrazine concentration of 2.5% or above, at least 93% of the theoretical amount is realized.

Essentially the process consists in: treating the hydrazine solution so as to remove the carbonate ion therefrom, and providing, in mixture with the solution, a quantity of urea equal to or greater than that theoretically required by Equation 2 for complete reaction of the hydrazine (2 mols of urea per mol of hydrazine); boiling the mixture under reflux continuously for at least about 15 to 20 hours and preferably substantially longer, e.g. more than 24 hours; and, after cooling, filtering off the resultant biurea precipitate.

The dilute hydrazine solution herein employed may be prepared by any one of a variety of methods, for example the well-known Raschig synthesis or one of its variants, such as the mixed phase reaction process described by J. E. Weiler et al. in United States Patent No. 2,675,298, which are conventionally used for large scale commercial production of dilute hydrazine solutions. Carbonate ion commonly occurs in the products of these processes, presumably as a result of exposure of the caustic employed in the processes to the carbon dioxide in the air. However, a particularly convenient method of hydrazine preparation, from the standpoint of simplicity and cost of operation, is based on the Thönnessen process described in German Patent No. 729,105, issued December 10, 1942. In this procedure, sodium hypochlorite is reacted with urea in the presence of excess sodium hydroxide and a small proportion of a manganese salt, to produce hydrazine according to the reaction

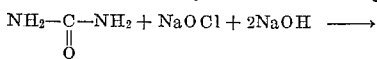

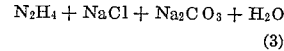

(3)

Specificaly, to a solution of sodium hypochlorite (which may be readily prepared from sodium hydroxide and chlorine) in a concentration ranging from about 1.5 mols per liter upward (e.g. to as much as 2.8 mols per liter), containing at least about 2.5 mols of sodium hydroxide per mol of sodium hypochlorite, and manganous sulfate (as a catalyst) in a concentration betwen 0.20 and 0.25 grams per liter, is added one mol of urea per mol of sodium hypochlorite. Other manganese salts, specifically potassium permanganate or manganese chloride, may be employed in place of the manganous sulfate, and indeed the catalytic agent may be omitted altogether, although with some loss in efficency of hydrazine production. This mixture may be boiled for about 5 minutes, to yield, for a 2 mols per liter hypochlorite concentration, hydrazine in a concentration of about 3.5% to 4.0%, i.e. an amount between 61% and 69% of that theoretically obtainable. Alternatively, and in large scale operations advantageously to prevent undesirable violence of reaction, the mixture may be heated initially only to 25° C. rather than being brought at once to a boil; the external application of heat is then removed and the exothermic reaction proceeds, with the temperature being raised by the heat of reaction itself to between 70° and 80° C. When the temperature reaches the latter value, external heat is again applied to produce an ultimate temperature of 95° to 100° C., at which point the mixture temperature may be adjusted, e.g. lowered, as desired for further treatment or use of the hydrazine solution thus produced. With this latter heating procedure, a yield of hydrazine in an amount between 75% and 80% of that theoretically obtainable is achieved. Whichever heating procedure is followed, the dilute hydrazine solution produced is found to contain carbonate ion as a reaction product of the hypochlorite-urea hydrazine synthesis.

If the sodium hypochlorite is produced by chlorination of sodium hydroxide, as described above, it has been found desirable to cool the hypochlorite solution to 5° C., which precipitates a proportion of the sodium chloride formed in the hypochlorite synthesis, and filter off this excess sodium chloride, prior to performing the urea-hypochlorite reaction to produce hydrazine. Under some conditions, there my be a decrease in ultimate yield of biurea produced from reaction of the hydrazine and urea unless the excess sodium chloride is thus removed. In addition, removal of the excess sodium chloride has been found to facilitate handling of the hypochlorite solution in the synthesis of hydrazine.

If the hypochlorite-urea mixture is to be boiled for 5 minutes to produce hydrazine according to the heating procedure first mentioned above, two mols per liter approximately represents a practical or preferred upper limit for hypochlorite concentration, since with higher concentrations the reaction tends to be violent and a considerable proportion of the hydrazine produced is then lost through decomposition. However, with the second-mentioned (and presently preferred) heating procedure described above, higher hypochlorite concentrations, e.g. as much as 2.8 mols per liter, may be employed satisfactorily without undue violence of reaction or loss of hydrazine yield. With lower hypochlorite concentrations, the hydrazine yield decreases, and it has been found that 1.5 mols per liter is the practicable lower limit for the production of hydrazine solution for biurea synthesis by the present process; concentrations below about 1.5 mols per liter give a hydrazine yield too small for satisfactory use in the latter. It will of course be appreciated that the foregoing method is only a presently preferred procedure for obtaining the dilute hydrazine solution used in the process of this invention, and the use of hydrazine prepared by other methods is equally embraced by the invention in its broader aspects.

Dilute hydrazine solution prepared as by the above operation is treated to remove the carbonate ion before performance of the biurea synthesis itself. This may be done in several ways. For instance, soluble calcium or barium salts may be added to the hydrazine solution in a quantity sufficient to precipitate the contained carbonate as the calcium or barium salt thereof. Alternatively, the pH of the alkaline hydrazine solution may be adjusted to below 8, and preferably to about 7.5, by the addition of acid; a mineral acid, or an organic acid suitable to eliminate the carbonate ion, may be used. At this pH, all the carbonate is converted to bicarbonate, which is then decomposed by refluxing the solution for two hours.

However, a presently preferred method of achieving carbonate removal comprises acidifying the dilute hydrazine solution to a pH below 7, and advantageously about or below 6, to liberate and evolve carbon dioxide gas. For this purpose, mineral acids such as sulfuric acid, hydrochloric acid or phosphoric acid, or acetic, citric or tartaric acid, i.e. organic acids suitable to eliminate carbonate ion, may be employed. Although oxidizing acids such as nitric acid could be used, they oxidize biurea and their presence in the biurea synthesis decreases the yield therefrom; consequently, particularly if acid sufficient to reduce the pH below 6 is to be used, it is desirable to employ non-oxidizing mineral acids. Thus, by way of example, for removal of carbonate a solution containing 40% sulfuric acid by volume is added to the dilute hydrazine solution prepared as above, in quantity sufficient to bring the pH of the solution below 7, and preferably below 6, removing the carbonate ion by the evolution of carbon dioxide gas. Advantageously, the hydrazine solution prepared as by either of the above-described heating procedures is cooled before this acidification step to a temperature of not more than 40° C., since the acidfication is exothermic in character and may otherwise result in some loss of hydrazine, i.e. unless the already-heated hydrazine solution is first cooled in this manner. That is to say, it is preferable that the acidfication step for removal of carbonate, as herein described, be carried on at a temperature of not more than 40° C. After acidification the concentration of the hydrazine in the solution is found to be between 2.5% and 3%, for an initial 2 mols per liter hypochlorite concentration in the hydrazine preparation, ranging to between 1.2% and 1.5% for an initial 1.5 mols per liter hypochlorite concentration.

Once the carbonate ion has been removed, the biurea synthesis may be performed at any pH within the range of 1 to 11. If the hydrazine solution has been prepared by the above-described operation using a manganese salt as a catalyst, synthesis of biurea at a pH above 7 will produce precipitation of manganese discoloring the product biurea. Therefore, should it be desired to avoid the discoloration, precipitation of the manganese may be inhibited by performing the synthesis at a pH below 7.

With a carbonate-free, dilute hydrazine solution within the aforementioned concentration range prepared by the above method (or by any other convenient operation), the process of the present invention is carried forward by providing in mixture therewith a quantity of urea equal to or in excess of that theoretically required to utilize all the hydrazine present, i.e. 2 mols of urea per mol of hydrazine. For a hydrazine concentration of 2.5% or above, a 5% to 10% excess of urea (or even as much as 50% excess, although not necessary) may be employed, to insure complete utilization of hydrazine, which is of course the most expensive reactant in the process. An excess of about 10% is presently found advantageous. The biurea obtainable therefrom, as mentioned before, is in an amount between 93% to 99% of that theoretically obtainable with the amount of hydrazine used. While lower hydrazine concentrations give a lower proportionate biurea yield, it has been found that the latter effect may be partially compensated for by significantly increasing the proportion of urea mixed therewith. Thus with a 1.2% to 1.5% hydrazine concentration (such as obtained from a 1.5 mols per liter hypochlorite solution by the hypochlorite-urea reaction described above), the provision of 6 mols of urea per mol of hydrazine (three times the theoretically required amount of urea) results in an amount of biurea equal to 50% of that theoretically obtainable from the hydrazine; by the provision of 12 mols of urea per mol of hydrazine a yield of biurea equal to 70% of that theoretically obtainable is achieved. In other words the amount of excess urea, if any, to be provided depends on the concentration of hydrazine present, and the desired efficiency of operation.

According to the present process, the mixture of dilute, carbonate-free hydrazine solution and urea in the above-recited proportions is brought to a boil and boiled continuously under reflux conditions for at least about 15 to 20 hours or longer, e.g. as much as 48 hours or more, or even as much as 72 hours, depending on the scale of the operation, the concentration of the hydrazine and the desired yield. In general, a longer time is required for a larger operation or a more dilute hydrazine solution or to achieve a better proportionate biurea yield. It is by virtue of this prolonged boiling, together with the provision of a carbonate-free dilute hydrazine solution, that the advantageous results of the process are achieved; that is to say, whereas previous methods for producing biurea (employing concentrated hydrazine solutions) involve short periods of heating, it is now found that through carbonate removal and the protracted boiling of the urea-hydrazine mixture good yields of biurea are obtainable from the dilute solutions of hydrazine here used. After boiling, the mixture is cooled, e.g. to room temperature, and the biurea produced (observable in the mitxure at the end of the boiling period as copious white precipitate) is removed, as by conventional filtering methods, washed, and dried.

While reference has been made above to use of hydrazine concentrations between 1.2% and 3%, the process may be performed, with similar economic advantages, for dilute hydrazine solutions of other concentrations as may be available, viz. concentrations (after carbonate removal) between 1% and 10%, and particularly concentrations in the general range of 1% to 5% after carbonate removal. The problem of obtaining biurea is particularly acute in the last-mentioned range, and in its most specific aspects the invention is partciularly directed to the use of such dilute solutions.

Very advantageously for simplicity, practicality and economy of operation, the above-described method for producing biurea may be combined with the synthesis of hydrazine as a single, substantially continuous process, the urea for both the hydrazine synthesis and the biurea production being added at one time. In this continuous process, a solution of sodium hypochlorite in a concentration ranging from about 1.5 mols per liter upward to as much as 2.8 mols per liter is prepared as before, e.g. by chlorination of sodium hydroxide, with the excess product sodium chloride desirably removed by cooling the hypochlorite solution to 5° C. and filtering off the resultant sodium chloride precipitate. The hypochlorite solution is provided with at least about 2.5 mols of sodium hydroxide per mol of sodium hypochlorite. To this latter solution is added urea in a quantity sufficient not only for complete reaction with the hypochlorite in the hydrazine synthesis but also sufficient, or preferably more than sufficient, e.g. 5% to 10% in excess of the theoretical amount, for complete reaction (in the subsequent biurea synthesis) with the hydrazine produced in the urea-hypochlorite reaction. In other words, one mol of urea is added per mol of hypochlorite, the theoretical amount for production of one mol of hydrazine per mol of hypochlorite according to Equation 3 above, and in addition, two mols of urea are added for each mol of hydrazine to be produced, i.e. the theoretical amount for complete reaction of the hydrazine according to Equation 2 above, or desirably an excess, e.g. 5% to 10% above the theoretical amount. Since the hydrazine produced in the hypochlorite-urea reaction is somewhat less than the amount theoretically obtainable, an initial addition of about 3 mols of urea per mol of hypochlorite or slightly more will provide the desired excess for the biurea synthesis. Manganous sulfate or one of the other manganese salts mentioned above is also preferably added (as before) as a catalyst.

The hypochlorite solution, thus containing about 3 mols of urea per mol of hypochlorite (and at least about 2.5 mols of sodium hydroxide per mol of hypochlorite as stated above), forming a slurry, may be boiled for 5 minutes to produce hydrazine. Alternatively, and preferably, it may be heated to 25° C.; the heat removed and the exothermic reaction allowed to proceed to a temperature of 70° to 80° C. from heat of reaction; and at that point further heated externally to a temperature of 95° to 100° C., for hydrazine production. The resultant hydrazine solution, still conating more than 2 mols of unreacted urea per mol of hydrazine, is then cooled to about 40° C. The carbonate is removed by adding a suitable acid (i.e., as described above, a mineral acid, preferably non-oxidizing, or an organic acid suitable to remove carbonate ion), e.g. a solution containing 40% sulfuric acid by volume, to bring the pH of the hydrazine solution below 7 and preferably below 6, while the 40° C. temperature is maintained, to eliminate the carbonate by evolution of carbon dioxide gas. Alternatively the carbonate could be removed by adding a soluble barium or calcium salt to the solution to precipitate the carbonate as the barium or calcium salt thereof.

With the carbonate removed, the hydrazine-urea mixture is heated to boiling and refluxed vigorously and continuously for at least 15 to 20 or as much as 48 hours or more. The biurea produced, visible as a white precipitate, is washed and dried as before. The yield of biurea obtainable with this process is up to 80% of that theoretically obtainable from the hypochlorite used, and about 90% to 95% of that theoretically obtainable from the hydrazine produced in the hypochlorite-urea synthesis step. This yield, i.e. obtained with the above-described continuous process, is found to be as much as 10% to 20% higher (relative to the amount of hypochlorite used) than that obtained when the urea used in the biurea synthesis is added to the hydrazine solution after the hypochlorite-urea synthesis of hydrazine has been performed. It is believed that such increased yield, which constitutes a further and special advantage of the continuous process, is due not only to the modified reaction conditions therein but in particular to the presence of the large excess of urea at the commencement of the hypochlorite-urea synthesis, leading presumably to an increase in hydrazine yield in that step.

The following example, in which reference is made to the hypochlorite-urea synthesis of hydrazine, will serve further to illustrate the performance of the process embraced in the present invention:

Example I 417 grams of a solution containing five mols of sodium hydroxide (47.9% by weight) were introduced to a one-liter, three-necked flask fitted with an efficient stirrer. Water was added to provide a total liquid volume of 500 cc. With the liquid at a temperature of 20° C., chlorine gas was introduced thereto, while the liquid was agitated by vigorous stirring; the rate of chlorine supply was controlled so as not to elevate the temperature above 25° C. Over a period of one and one-half hours 1.1 mols of chlorine (between 78 and 79 grams) was absorbed in the mixture to produce a solution having a 2 mol per liter concentration of sodium hypochlorite and a total volume of 520 cc. At the end of the period, the molar ratio of unreacted sodium hydroxide to sodium hypochlorite in the solution was of the order of 3:1.

420 cc. of the later solution (containing 63.9 grams, i.e. 0.85 mol or 2.04 mols per liter of sodium hypochlorite) were introduced to a three liter Erlenmayer flask and 20 cc. of a 5% solution of manganous sulfate was added thereto. A solution of 51.4 grams (0.857 mol) of urea dissolved in 75 cc. of water was then introduced all at once, while the mixture was stirred vigorously; the mixture containing the added urea was brought quickly to the boiling point and maintained at a boil for between 4 and 5 minutes. During this period the color of the mixture changed from an initial rust brown to orange, and cleared. At the end of the boiling step the mixture was cooled to about 15° C. and kept at that temperature while 170 cc. of dilute sulfuric acid (40% by volume) were added in successive portions with stirring, to remove the carbonate ion by evolution of carbon dioxide gas. The resultant carbonate-free solution, which had a pH between 5 and 6, contained 18.82 grams of hydrazine (2.75% concentration), representing 69% of the yield theoretically obtainable from the hypochlorite used.

The latter solution was transferred to a two-liter round-bottomed flask fitted with a reflux condenser, and 77.88 grams of urea (1.3 mols, or an excess of 0.1 mol) were added to the flask. The system was then refluxed without interruption for between 15 and 16 hours. At the end of this period, a copious white precipitate was observed in the solution, which was permited to come to room temperature and filtered to remove the solid biurea product. The latter, after being washed with water and dried at 100° C. in an oven, was found to weigh 65.3 grams; an additional 0.4 gram was recovered by chilling the filtrate liquor, giving a total yield of 65.7 grams of biurea, 95.3% of the amount theoretically obtainable with the hydrazine used.

Example II

A solution of sodium hypochlorite at 2 mols per liter concentration was prepared in the cold from a solution of sodium hydroxide at 10 mols per liter concentration by introducing chlorine gas thereto and maintaining the chlorine supply until 2 mols of chlorine were absorbed for each liter of solution. The solution was then cooled to 5° C., causing precipitation of sodium chloride, which was filtered off. Approximately 3 mols of unreacted sodium hydroxide per mol of sodium hypochlorite remained in the solution.

386 ml. of water and 0.53 gram of manganous sulfate were introduced to a 12-liter round-bottomed flask fitted with a stirrer and a condenser and cooled to 5° C. 680 grams of urea (enough for reaction both with the hypochlorite and with the resultant hydrazine, as a continuous process) were added to this solution, forming a slurry. 1.81 liters of the sodium hypochlorite solution at 2 mols per liter concentration (3.62 mols of hypochlorite), containing 3 mols of sodium hydroxide per mol of hypochlorite, were introduced to the flask as rapidly as possible, while the temperature was maintained below 5° C. The mixture was heated slowly to 25° C. and the heat then removed; the urea-hypochlorite reaction proceeded, elevating the temperature to between 70° and 80° C. Vigorous bubbling was observed and the mixture changed from a brown color to tan, then to orange, and finally became almost colorless. When the temperature elevation from the heat of reaction had reached its peak, heat was once more applied, to bring the temperature to between 95° and 100° C. The mixture was then cooled to 40° C. On testing, the solution was found to contain 3.3% hydrazine.

With the solution kept at a temperature of 40° C. by external cooling a solution of sulfuric acid (40% by volume) was added, in quantity sufficient to lower the pH to between 1 and 3, for removal of carbonate. It was observed that large volumes of carbon dioxide gas were liberated. After this acidification, the solution (diluted by the addition of the sulfuric acid) was found to contain 2.5% hydrazine.

The carbonate thus having been removed, the solution containing hydrazine and the unreacted portion of the earlier introduced urea was brought to a boil and continuously and vigorously refluxed for 48 hours to produce biurea. At the end of this time, the flask was flooded with water and the resultant slurry (i.e. containing the biurea as white precipitate) was filtered. After careful washing to free it of soduim sulfate, the biurea was oven dried at 40° C. It was found that the yield of biurea was 336 grams, or 78% that theoretically obtainable from the 3.62 mols of sodium hypochlorite used.

Example III

The procedure outlined in Example II was followed, employing the same quantities of materials and reaction conditions, except that only 240 grams of urea (about 1.1 mol of urea per mol of hypochlorite) were mixed with the 1.81 liters of hypochlorite solution before the hydrazine synthesis step, and 440 grams of urea were added to the resultant hydrazine solution after acidification of the latter. That is, the urea for the biurea synthesis step was after the synthesis of hydrazine, rather than before (as in Example II), although the total quantity of urea employed was the same as in Example II, viz., 680 grams. The yield of biurea obtained by refluxing this last-mentioned mixture under the conditions set forth in Example II was found to be 72.5% of that theoretically obtainable with the hypochlorite used, as compared with 78% yield obtained by the continuous process of Example II.

It will be noted that the procedures of the examples afforded excellent yields of biurea from carbonate-free hydrazine solutions of a concentration in the range of about 1% to about 5%, i.e. representing dilute solutions from which it has heretofore been difficult or practically impossible to obtain useful production of biurea.

It is to be understood that the invention is not limited to the operations hereinabove specifically described but may be carried out in other ways without departure from its spirit.

What is claimed is:

1. A method of making biurea, comprising establishing a solution of sodium hypochlorite of a concentration in a range between about 1.5 mols per liter and about 2.8 mols per liter containing an amount of sodium hydroxide equal in mols to at least about 2.5 times the amount in mols of sodium hypochlorite present, adding thereto an amount of urea about equal in mols to the amount in mols of sodium hypochlorite present, heating the mixture to between about 95° C. and about 100° C. to produce hydrazine, treating the mixture to remove carbonate therefrom by converting free carbonate ion in the mixture to a compound physically separable from said mixture; adding urea in an amount in mols equal to at least twice the amount of hydrazine in mols present in the solution, and heating the mixture to boiling under reflux conditions for at least about 15 hours to effect reaction of hydrazine and urea to yield biurea.

2. A method of making biurea, comprising establishing a solution of sodium hypochlorite of a concentration in a range between about 1.5 mols per liter and about 2.8 mols per liter containing an amount of sodium hydroxide equal in mols to at least about 2.5 times the amount in mols of sodium hypochlorite present, adding thereto urea in an amount in mols equal to at least the amount in mols of sodium hypochlorite present plus twice the amount in mols of hydrazine to be produced from reaction of urea and sodium hypochlorite, heating the mixture to between about 95° C. and about 100° C. to produce hydrazine, treating the mixture to remove carbonate therefrom by converting free carbonate ion in the mixture to a compound physically separable from the mixture, and heating the carbonate free mixture to boiling under reflux conditions for at least about 15 hours to effect reaction of hydrazine and urea to yield biurea.

3. The method of claim 2. wherein said step of treating the mixture to remove carbonate therefrom is effected by adding to the mixture a salt from the group which consists of soluble calcium and barium salts, for precipitation of the carbonate as a salt, in sufficient quantity for removal of the carbonate.

4. The method of claim 2, wherein said step of treating the mixture to remove carbonate therefrom is effected by adding acid to the mixture in an amount effective to bring the pH of the mixture below 7.

5. A method of making biurea, comprising establishing a solution of sodium hypochlorite of a concentration between about 1.5 and about 2.8 mols per liter, by reaction of chlorine gas and sodium hydroxide, cooling said sodium hypochlorite solution to about 5° C., for precipitation of sodium chloride, filtering the precipitated sodium chloride, said sodium hypochlorite solution containing an amount of sodium hydroxide equal in mols to at least about 2.5 times the amount in mols of sodium hypochlorite present, adding to said sodium hypochlorite solution an amount of urea equal in mols to at least about 3 times the amount in mols of sodium hypochlorite present, adding a manganous salt as a catalyst, heating the mixture to about 25° C., removing the heat while the temperature of the mixture rises, from heat of reaction, to between 70° and 80° C., heating the mixture to between 95° and 100° C., cooling the mixture to a maximum temperature of about 40° C., acidifying the mixture, while maintaining the temperature of the mixture at not more than about 40° C., by adding a non-oxidizing acid to the mixture in an amount effective to bring the pH of the mixture below 6, for removal of carbonate therefrom, and heating the carbonate-free mixture to boiling under reflux conditions for at least about 48 hours to effect reaction of hydrazine and urea to yield biurea, the pH of said mixture being between 1 and 11 for said boiling step.

6. The method of claim 5, wherein the pH of said carbonate-free mixture is below 7 for said step of boiling to effect reaction of hydrazine and urea to yield biurea.

References Cited by the Examiner

UNITED STATES PATENTS

| | | | |
|---|---|---|---|
| 1,959,503 | 5/1934 | Seuffert et al. | 23—190 |
| 2,692,281 | 10/1954 | Newby et al. | 260—554 |

FOREIGN PATENTS

| | | |
|---|---|---|
| 214,400 | 4/1958 | Australia. |
| 729,105 | 12/1942 | Germany. |

OTHER REFERENCES

Audrieth et al., Chemistry of Hydrazine (1951), page 36.

Das-Gupta, J. Ind. Chem. Soc., Vol. 10 (1933), pages 111 and 113.

Hiller, Jr., et al., Principles of Chem., McGraw-Hill (1960), page 628.

NICHOLAS S. RIZZO, *Primary Examiner.*

IRVING MARCUS, *Examiner.*